(12) United States Patent
DePasqua

(10) Patent No.: US 8,879,359 B2
(45) Date of Patent: Nov. 4, 2014

(54) SONAR NAVIGATION SYSTEM AND METHOD

(71) Applicant: Louis DePasqua, Round Lake Beach, IL (US)

(72) Inventor: Louis DePasqua, Round Lake Beach, IL (US)

( * ) Notice: Subject to any disclaimer, the term of this patent is extended or adjusted under 35 U.S.C. 154(b) by 0 days.

(21) Appl. No.: 13/652,438

(22) Filed: Oct. 15, 2012

(65) Prior Publication Data

US 2013/0044569 A1    Feb. 21, 2013

Related U.S. Application Data

(63) Continuation of application No. 12/537,887, filed on Aug. 7, 2009, now Pat. No. 8,305,844.

(60) Provisional application No. 61/087,098, filed on Aug. 7, 2008.

(51) Int. Cl.
| | |
|---|---|
| *G01S 15/00* | (2006.01) |
| *G01S 15/02* | (2006.01) |
| *G01S 15/96* | (2006.01) |
| *G01S 15/89* | (2006.01) |
| *G01S 15/42* | (2006.01) |
| *G01S 7/52* | (2006.01) |

(52) U.S. Cl.
CPC ............... *G01S 15/96* (2013.01); *G01S 15/025* (2013.01); *G01S 15/8902* (2013.01); *G01S 15/42* (2013.01); *G01S 7/52004* (2013.01)
USPC ............... 367/103; 367/87; 367/99; 367/107; 367/115; 367/110

(58) Field of Classification Search
USPC ....................... 367/87, 99, 107, 115, 103, 110
See application file for complete search history.

(56) References Cited

U.S. PATENT DOCUMENTS

| | | | | |
|---|---|---|---|---|
| 5,537,380 | A * | 7/1996 | Sprankle et al. | ............... 367/111 |
| 5,568,152 | A * | 10/1996 | Janky et al. | ............... 342/357.68 |
| 8,305,844 | B2 | 11/2012 | DePasqua | |
| 2003/0235112 | A1 * | 12/2003 | Zimmerman et al. | ............ 367/4 |
| 2009/0147623 | A1 * | 6/2009 | Betts et al. | ........................ 367/88 |
| 2010/0014386 | A1 * | 1/2010 | Thompson et al. | ............ 367/104 |
| 2010/0103775 | A1 * | 4/2010 | Betts et al. | ....................... 367/88 |

OTHER PUBLICATIONS

Humminbird, 'Trolling Motor Mounted Transducer', 2007, pp. 1-2.*

* cited by examiner

*Primary Examiner* — Isam Alsomiri
*Assistant Examiner* — Assres H Woldemaryam
(74) *Attorney, Agent, or Firm* — Neal, Gerber & Eisenberg LLP; James P. Muraff

(57) ABSTRACT

A method for pre-determining an underwater objects GPS position using a rotatable scan sonar unit linked to a boat, magnetic compass and GPS receiver. This system determines the underwater objects GPS position using the objects distance, compass heading and a GPS receiver/sonar on a boat. This system will provide real time longitude and latitude positions of underwater objects seen with sonar at a distance from a boat, and will allow for precise autopilot navigation or fixed position fishing. The system can also be used to correct for GPS errors when using previously stored waypoints positions of an object. The computer determines an objects underwater GPS position using a sonar transducer and mounted on a 360 degree movable mechanism such as a trolling motor unit, or phased array of transducers and a compass to provide heading information and formulates the objects position based on the distance and heading of the object in relation to the boats current GPS position.

21 Claims, 3 Drawing Sheets

SONAR NAVIGATION SYSTEM AND METHOD

RELATED APPLICATION

This application is a continuation application of U.S. patent application Ser. No. 12/537,887, filed Aug. 7, 2009 entitled SONAR NAVIGATION SYSTEM AND METHOD, which claims priority to U.S. Provisional Application No. 61/087,098, filed Aug. 7, 2008 entitled SONAR NAVIGATION SYSTEM AND METHOD, both of which are incorporated by reference in their entirety.

FIELD OF THE INVENTION

The present invention relates to sonar navigation systems. In particular, the present invention relates to a system and method for storing and/or recalling coordinates of the location of underwater objects.

SUMMARY OF THE INVENTION

Sonar units are an important tool for fisherman on a boat sonar units provide the user water depth, structure and fish location. The sonar transducer is used to send echo signals to determine the position of an object and the distance to the object in the water. The sonar transducer can be mounted in several different boat locations including transom mount, through hull or mounted on the lower unit of an electric trolling motor providing multi directional pointing of the sonar echo beam. The sonar transducer can also be mounted in different configurations including, side scan, forward scan, backward scan and down scan viewing of objects in many directions in the water. With the ability to scan in multiple directions the fisherman can cast to objects in the water without getting to close to scare the fish off of these objects. The objects in the water may be in the form of submerged trees, rocks, boats, fish cribs and many other underwater objects. Sonar units may also have built in GPS receivers used to show the boats position or previously stored GPS waypoint positions showing structure found in the lake that fish like to hide in. Some sonar units have the ability to side scan large areas of water showing objects on the bottom of the lake, and are capable of marking these objects position based upon GPS data stored at the time of the sonar side scanning The user can freeze the sonar display screen and cursor to the previously viewed object on the screen and mark or store the GPS position to use later for navigation to the object. These side scan systems require the boat to be moving to determine the compass heading using the GPS movement to calculate the heading. There is a need for accurately determining an object's GPS location if the boat is in a fixed position. Using a compass mechanically in line with the pointing direction of the sonar beam allows for an improved method for determining the GPS position of an object in the water. This sonar/compass configuration is mounted on a 360-degree movable mechanism allowing for sweeping or scanning of a large area while the boat is in a fixed position or moving.

As such, the present invention is directed towards an improved method for determining the GPS position of an object in the water up to hundreds of feet or more away from the boat. This is done with aid of long range side scan sonar technology and by mounting a side/forward scan sonar transducer to the lower unit of an electric trolling motor. The fisherman can then direct the sonar beam by slowly spinning/ steering the trolling motor lower unit, scanning the lake bottom 360 degrees and hundreds of feet from the boat. This system works whether the boat is moving or standing still. The sonar computer continuously stores compass heading, distance, and current GPS position as the lake bottom is scanned. The user can select any object (current or past view) on the screen to determine the GPS position of that object and use the GPS data to navigate the boat or correct previously stored object positions as a form of GPS error correction. The system determines the GPS position of objects with the aid of a compass linked or inline with the sonar transducers scanning direction and pointing device (trolling motor) that may be in the form of a steerable trolling motor connected to a sonar unit. The GPS position is calculated by the sonar computer knowing the distance the object is from the boat and the compass heading direction pointing to the object. The computer then reads the boat's current longitude and latitude position and formulates the object's position using the distance and compass direction to the object. The underwater object GPS position data can be used for the boat's auto pilot navigation to guide the boat to the under water object. The user can set a distance parameter keeping the boat within a set distance away from the object, allowing the fisherman to cast to the object but keeping a far enough distance not to scare off the fish hiding in the object. The system may also incorporate a wind detection device to properly keep the boat pointing into the wind allowing for accurate boat navigation. The forward/side scan sonar transducer may be attached to the trolling motor lower with a removable bracket or may be manufactured permanently into the trolling motor lower unit casing.

In another embodiment, the system may incorporate sonar using a 360-degree view showing the bottom of the lake all the way around the boat. This system will control the turning speed of the sonar transducer by spinning the trolling motor steering motor at a specific rotation speed, this speed can be measured by a feedback position sensor on the motor or by using the compass heading data measuring the degree of movement over time. As the transducer spins the lake bottom is scanned and the image is drawn on the sonar screen. A stand-alone motorized mechanical spinning transducer device can also be used to replace the trolling motor as a turning mechanism. Another configuration of a 360 degree scanning system my incorporate a fixed position hull mounted phase array electronic scanning transducer with compass. This system uses the same object detection method described above to determine GPS waypoint positions of objects around the boat using a fixed boat mounted compass module.

In another embodiment the compass module that is mounted in the trolling motor may be used as a direction pointer and is coupled to the sonar unit for directing the map view image on the sonar screen. This system will allow the user to rotate the navigation map image 360 degrees around showing what direction (heading) the boat should go to navigate to a GPS waypoint. The waypoint may be underwater objects like trees, rocks and other submerged objects. This method will be very helpful to the user as it will give a good visual understanding of the current pointing position of the trolling motor head in relation to marked waypoints and objects in the water. Current sonar units require the boat to be moving to acquire a compass heading using GPS generated headings. This system is unique, as the trolling motor pointing heading direction will automatically control the view of the map on the sonar without the need for the boat to be moving to acquire a compass heading.

Other aspects of the present invention will become apparent and be more fully understood from the following detailed description and accompanying drawings, which set forth illustrative embodiments that are indicative of some of the various ways in which the principals of the invention may be employed.

DETAILED DESCRIPTION

The description that follows describes, illustrates and exemplifies one or more particular embodiments of the present invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

Figure 1:
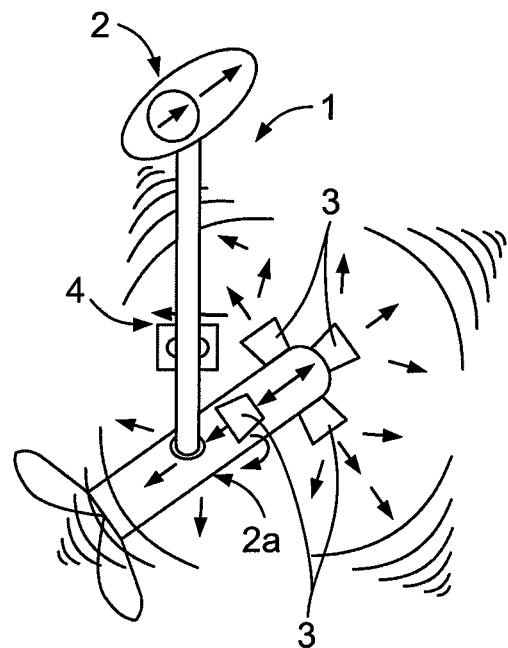
FIG. 1 is a diagram showing the trolling motor with a compass and a transducer.

FIG. 1 shows an electric trolling motor 1 equipped with a compass module 2 built into the top of the motor head. The lower unit 2a has a four directional sonar transducers 3, 6 at the front of the lower unit. The transducers can send sonar beams forward, backward and the left and right to the sides. The compass 2 is in line with the transducer allowing the system to measure the heading direction of the sonar beams. This is significant in detecting the underwater objects position in relation to the trolling motors pointing direction. This distance and heading are significant in calculating the GPS position of the object in the water. Steering motor 4 is used to turn the motor and sweep the waters around the boat searching for objects like submerged structure, weeds, trees, rocks, cribs, weed lines and fish.

Figure 2:
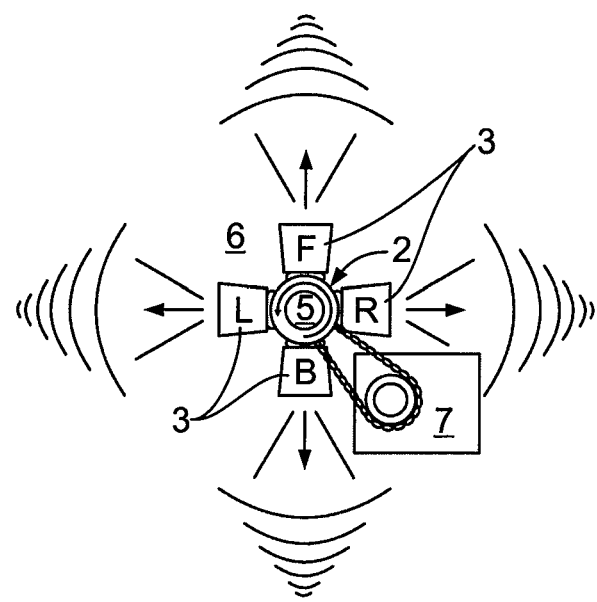
FIG. 2 is a diagram showing the transducer coupled to a motor for 360 degree positioning.

FIG. 2 is a stand alone steering device using steering motor 7 to direct the sonar transducers 3, 6 in the desired direction scanning for underwater objects. Compass 5 is used to know the heading an object is located at. This device can be a stand alone pointing unit that may be mounted directly to the bottom of the boat. This eliminates the need for an electric trolling motor to position the sonar scanning beam.

Figure 3:
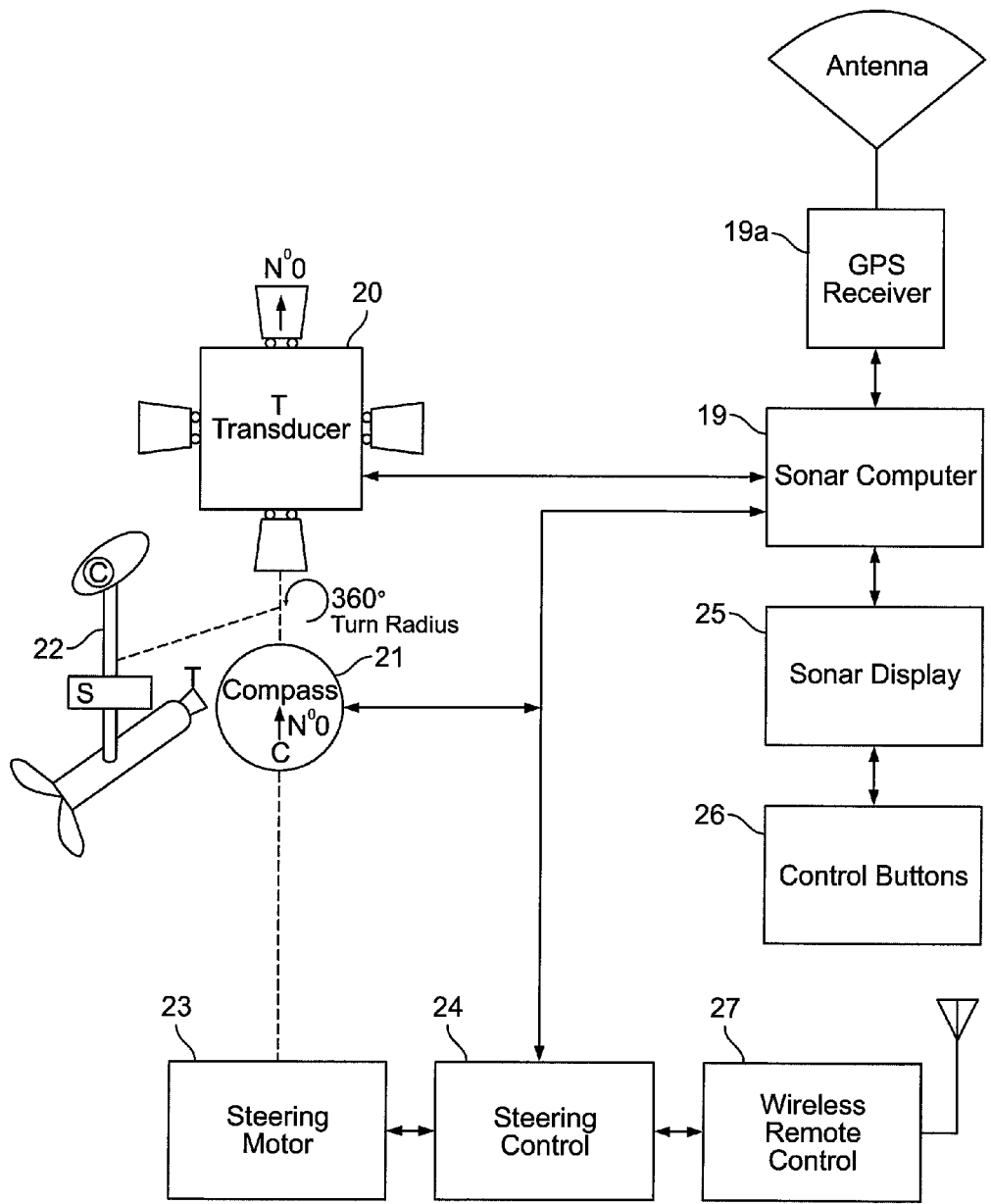
FIG. 3 is a block diagram of the sonar system.

FIG. 3 is a block diagram showing the trolling motor transducer 20, compass 21, and steering motor 23 connected to the sonar computer system 19. The pointing direction of the trolling motor can be controlled by the sonar computer via steering control 24 and can be used to provide 360 degree circle scanning or can be controlled by an external wireless remote control steering device 27. This external steering remote may also have a slow speed steering option to allow for variable speed turning of the trolling motor, to sweep the lake bottom in detail. Sonar transducer 20 is mechanically linked and in line with the compass module 21 with trolling motor 22. The compass data is passed to the sonar computer 19 and provides heading data used to formulate the GPS longitude and latitude of an object seen in the water by the sonar. The transducer 20 transmits sonar echoes in the water allowing the sonar computer 19 to create an image on the display that represents the lake bottom. The sonar computer also stores compass heading, GPS position and distance information along with the sonar images. This information can be used later to mark a waypoint location of an object. The user can select objects on the sonar display 25 via a cursor or touch display LCD. Once an object or location is selected on the display, the computer 19 uses the previously stored information to generate the selected objects GPS waypoint position. To formulate the GPS longitude and latitude of a selected point, location or object, the computer uses the current or stored position of the boat via the GPS receiver 19a and the heading/pointing direction of the sonar beam, with the distance to that location/object to formulate the desired GPS longitude and latitude.

One example of a set of formulas that may be useful to generate the desired latitude and longitude coordinates for this position is set forth below. These formulas also take into account the earth's circumference, although this is not necessary for short distances used with this system, as follows:

$$lat\ asin(sin(lat1)*cos(d)+cos(lat1)*sin(d)*cos(tc))$$

$$dlon\ atan2(sin(tc)*sin(d)*cos(lat1),cos(d)-sin(lat1)*sin(lat))$$

$$lon\ mod(lon1-dlon+pi,2*pi)-pi$$

Where a angle; lat1/lon1 current position; d distance; tc circumference.

Sonar computer 19 can be programmed using C or Assembly language software to process this formula, and can also use a RISC style microprocessor, such as can be provided by MICROCHIP (Chandler, Az.) Eighteen (18) series microprocessor. The computer 19 can also use the newly formulated GPS position of an object to correct for GPS errors knowing that a previously marked waypoint is being viewed near this position. The user can correct the position of the previously stored waypoint by highlighting the old waypoint and pressing a correction button on the sonar control module 26. The user could also use this reference object to correct all waypoints stored on the lake. Sonar display 25 provides images of under water objects along with navigational map views. The control buttons 26 are used to program and operate the sonar system. The trolling motor seen in FIG. 3 also provides the user a view of an object while navigated towards that object. This can be accomplished when using a forward scan transducer in conjunction with the compass and autopilot navigation system. This navigation system allows the sonar unit to control the navigation by reading the compass heading 12 from the trolling motor 22 and controlling the steering via the trolling motor steering control 24. The user can also offset the compass 12 positions to help view the object while navigating toward it. The offsetting of the compass can be manually done via a remote control device 27 or can be offset using the sonar controls 26.

The sonar system seen in FIG. 3 is also capable of keeping the boat at a specified distance from the boat. The user can select how many feet they would like the boat to be away from an object and the GPS navigation system will keep the boat within that distance. This will be useful while fishing as the fisherman may want to stay away from an object to keep from chasing the fish away do to the fisherman's presents.

Figure 4:
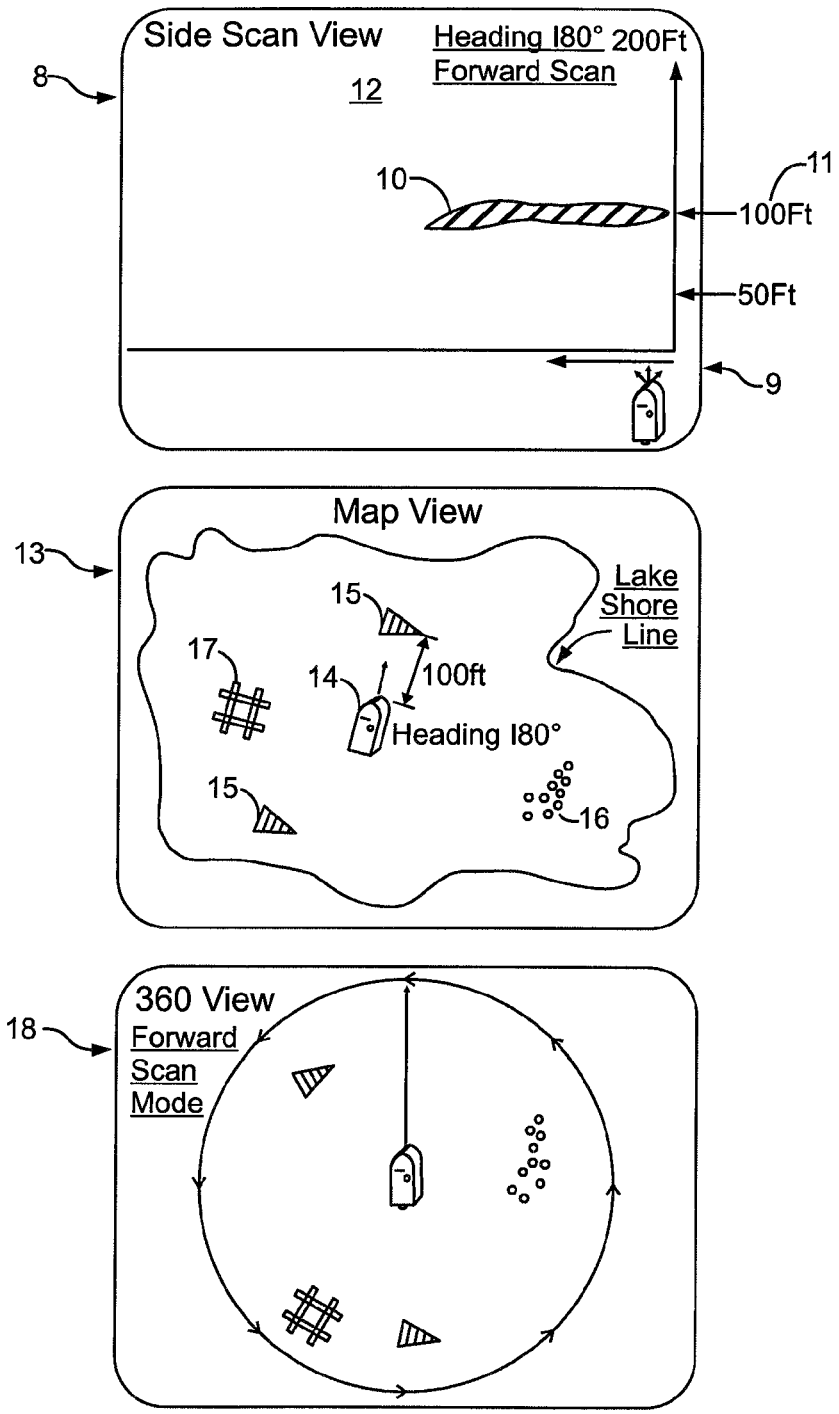
FIG. 4 is a diagram showing various sonar display views.

FIG. 4 diagram shows the display views of the sonar unit 25. Display view 8 shows a forward scan image of the boat 9 scanning the water up to 200 feet. An object 10 can be seen 100 feet away from the boat 11. This object is located 180 degrees in line with the head of the trolling motor unit compass 2. This display view may be used to select any direction of the trolling motor (forward, backward or left and right side scan). In any one of these views the compass 21 can provide the direction of an object in the water. The display may also provide multiple views with split view mode. Display view 13 shows a map style image of the lake and position of the boat 14 in relation to the objects 15, 16, 17, in the water. Because the compass 21 is connected to the sonar computer 19, the view of the map in relation to the boat will be true to the pointing position of the trolling motor head pointing direction. This is significant as the user may want to direct the boat to a previously stored waypoint or object and can do so by simply turning the trolling motor head into the direction of the object seen on the display. The sonar display has the option to reposition the boat's icon position or turn the complete display image so the pointing direction can be seen at the top of the display. This means the display will rotate in relation to the pointed position. Most sonars use a GPS generated compass heading that does not operate when the boat is standing still and the boat's or trolling motor's pointing position does not match the image on the screen. That is only one of the benefits of having a compass mounted in the trolling motor head and connected to the sonar GPS system.

Sonar image 18 shows a 360 degree image of the bottom of the lake around the boat. This image is drawn by the sonar precisely spinning the transducer slowly around and creating an image. The compass heading can be used to set the turning speed of the transducer assembly by measuring the amount of movement in degrees over time. As the motor turns and the image is created, the compass heading and GPS position of the boat is stored allowing for object position selecting when the scan is complete.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A method of determining location coordinates for an underwater object, comprising the steps of:
    causing, using a processor, a sonar transducer to transmit a sonar beam, the sonar transducer being mounted on a rotatable member;
    receiving, at the processor, a direction heading from a compass positioned in line with a pointing direction of the sonar transducer;
    causing, using the processor, the sonar beam to scan an underwater area by rotating the sonar transducer 360 degrees relative to the pointing direction;
    receiving, at the processor, sonar information from the sonar transducer, the sonar information identifying a plurality of underwater objects and a distance between at least one of the plurality of underwater objects and the sonar transducer;
    receiving, at the processor, a current position of the sonar transducer;
    calculating, using the processor, a set of location coordinates for the at least one of the plurality of underwater objects using the distance, the current position, and the direction heading; and
    storing, using the processor, the set of location coordinates for the at least one of the plurality of underwater objects in a memory.

2. The method of claim 1 wherein the set of location coordinates comprise a latitude coordinate and a longitude coordinate.

3. The method of claim 1 wherein the current position is provided by a set of GPS coordinates.

4. The method of claim 1 wherein the step of calculating a set of location coordinates is performed in response to receiving a selection of the at least one of the plurality of underwater objects.

5. The method of claim 1 wherein the set of location coordinates is stored as a waypoint.

6. The method of claim 1 further comprising the steps of:
    receiving, at the processor, an identification of the at least one of the plurality of underwater objects;
    storing using the processor, the identification in the memory; and
    associating, using the processor, the identification with the set of location coordinates for the at least one of the plurality of underwater objects.

7. The method of claim 1 further comprising the steps of:
    determining, using the processor, an angular displacement of the sonar beam relative to the direction heading provided by the compass; and
    calculating, using the processor, a direction to one of the plurality of underwater objects by relating the angular displacement.

8. The method of claim 1 wherein the sonar transducer provides the sonar information upon receiving;
    a reflected sonar beam generated by the sonar beam impinging on one or more of the plurality of underwater objects and
    computing the distance from the transducer to the one or more of the plurality of underwater objects.

9. The method of claim 1 further comprising fixing the current position of the sonar transducer relative to the set of location coordinates calculated for at the least one of the plurality of the underwater objects.

10. The method of claim 4 further comprising receiving, at the processor, the selection of the at least one of the plurality of underwater objects, wherein the receiving the selection comprises receiving a user input from a touch screen associated with the sonar transducer, the touch screen displaying the plurality of underwater objects indicating which object on the touch screen the user wishes to select.

11. The method of claim 1 further comprising steps for correcting previously generated location coordinates for the plurality of underwater objects, the previously generated location coordinates being stored in the memory and comprising a fist set of stored coordinates for a first one of the plurality of the underwater objects and a second set of stored coordinates for a second one of the plurality of underwater objects, the steps comprising:
    retrieving from the memory the first set of stored coordinates;
    determining a new set of location coordinates for the first one of the plurality of underwater objects;
    calculating at least one difference value between the first set of stored coordinates and the new set of location coordinates; and
    applying the at least one difference value to the second set of stored coordinates.

12. An apparatus for determining the location of at least one of a plurality of underwater objects comprising:
    a sonar transducer mounted on a rotatable member, the sonar transducer being configured to transmit a sonar beam and generate sonar information identifying a plurality of underwater objects and a distance between the at least one of the plurality of the underwater objects and the sonar transducer;

a compass positioned in-line with a pointing direction of the sonar transducer, the compass being configured to determine a direction heading;

a position detection receiver configured to determine a current position of the sonar transducer, and a processor configured to:
- cause the sonar beam to scan an underwater area by rotating the sonar transducer 360 degrees relative to the pointing direction,
- calculate a set of location coordinates for the at least one of the plurality of underwater objects using inputs from the sonar transducer, the compass, and the position detection receiver, the inputs including the direction heading, the sonar information, and the current position, and
- store the set of location coordinates in a memory.

13. The apparatus of claim 12 wherein the rotatable member is a trolling motor, and rotating the trolling motor causes the sonar transducer to rotate.

14. The apparatus of claim 12 wherein the rotatable member is mounted to a bow of a boat, and the rotating and rotatable member causes the sonar transducer to rotate.

15. A method for determining a location of underwater objects comprising the steps of
- causing, using a processor, a sonar transducer mounted on a rotatable member to generate a directional sonar beam originating from a first location;
- receiving, at a processor, positional information corresponding to said first location;
- receiving, at the processor, heading information from a heading sensor positioned in line with a pointing direction of the sonar transducer;
- causing, using the processor, the directional sonar beam to sweep over an underwater area in a circle;
- receiving, at the processor and from the sonar transducer, sonar reflection information generated by the sonar transducer based on a reflection of the directional sonar beam off of an underwater object during said sweep;
- receiving, at the processor and from the sonar transducer, distance information generated by the sonar transducer based on said reflection, the distance information comprising a distance between the underwater object and the first location;
- determining, using the processor, a direction of the sonar beam relative to the heading information; and
- determining, using the processor, a second location corresponding to said underwater object based on the direction of the sonar beam, the distance information, and the positional information of said first location.

16. The method of claim 15 further comprising storing the second location as latitude and longitude coordinates for the underwater object.

17. The method of claim 15 further comprising generating an interactable graphical 360 degree image of the swept underwater area based on the sonar reflection information and the distance information generated by the sonar transducer.

18. The method of claim 15 wherein the positional information includes a set of GPS coordinates.

19. The new method of claim 1 further comprising:
generating, using the processor, a 360 degree image on the sonar information, the 360 degree image including the plurality of underwater objects.

20. The apparatus of claim 12 further comprising:
a display configured to a display a 360 degree image generated by the processor based on the sonar information from the sonar transducer, the 360 degree image including the plurality of underwater objects.

21. The apparatus of claim 12 wherein the position detection receiver is a GPS receiver, and the current position as a set of GPS coordinates.

* * * * *